United States Patent [19]

Kersey

[11] Patent Number: 5,757,487
[45] Date of Patent: May 26, 1998

[54] METHODS AND APPARATUS FOR DISTRIBUTED OPTICAL FIBER SENSING OF STRAIN OR MULTIPLE PARAMETERS

[75] Inventor: Alan D. Kersey, Fairfax Station, Va.

[73] Assignee: The United States of America as represented by the Secretary of the Navy, Washington, D.C.

[21] Appl. No.: 791,297

[22] Filed: Jan. 30, 1997

[51] Int. Cl.$^6$ ............................................. G01B 9/02
[52] U.S. Cl. ............................................. 356/345; 356/349
[58] Field of Search ........................... 356/345, 349, 356/35.5; 250/227.19

[56] References Cited

U.S. PATENT DOCUMENTS 4,755,668  7/1988  Davis .................................. 356/345
5,361,130  11/1994  Kersey et al. ....................... 356/345

FOREIGN PATENT DOCUMENTS

2262803  6/1993  United Kingdom ................. 356/345

*Primary Examiner*—Frank G. Font
*Assistant Examiner*—Robert Kim
*Attorney, Agent, or Firm*—Thomas E. McDonnall; George Jameson

[57] ABSTRACT

A distributed optical fiber sensor system including a patterned array of weakly reflecting broadband gratings or other sensors serially disposed along a common fiber. The laser sources are multiplexed onto the fiber and are propagated through a directional coupler toward the sensors. The return signals are directed by the directional coupler to a demultiplexer that separates the signals by center frequencies and sends each to a respective detector. All reflection signals generated by a single input pulse of a given wavelength are detected prior to the input coupling of the next input pulse of that wavelength, the input pulse repetition period being $T \geq Nt_0$, N being the number of grating sensors and $t_0$ being their spacing or separation in optical propagation time.

22 Claims, 6 Drawing Sheets

METHODS AND APPARATUS FOR DISTRIBUTED OPTICAL FIBER SENSING OF STRAIN OR MULTIPLE PARAMETERS

BACKGROUND OF THE INVENTION

1. Field of the Invention

The present invention relates generally to optical fiber systems for distributed sensing of multiple conditions, such as strains, using fiber Bragg gratings and interrogation by optical time domain reflectometry, and particularly such systems in which the gratings are asymmetric and aperiodic.

2. Description of the Related Art

While optical fiber-based systems using grating sensors or other reflection phenomena have been discussed in the literature, a practical distributed system has not been found.

One of the key obstacles in implementing a practical system has been the development of multiplexing instrumentation capable of resolving a large number of concurrent signals at the relatively low power levels that are desirable. Moreover, the system should be tolerant of relatively long fiber lengths and permit patterns of distribution of sensors that accommodate some variation.

SUMMARY OF THE INVENTION

The present invention provides a distributed optical fiber sensor system comprising an optical fiber including a first plurality of sensors, the sensors being weakly reflective in a second plurality of distinct wavelength ranges. A third plurality of laser pulse sources has each source tuned to an intermediate point of one of the second plurality of distinct wavelength ranges; and a multiplexer couples output pulses of the laser pulse sources onto the optical fiber for propagation in a common direction toward the sensors. A directional coupler and a demultiplexer couple reflected pulses from the sensors to a plurality of detectors, each of the detectors detecting reflected pulses in one of the second plurality of distinct wavelength ranges, laser pulses from the laser pulse sources being timed to repeat after detection of the reflected pulses and to prevent earlier repetition.

According to a first feature of the invention, a combination of time-division-multiplexing and wavelength-division-multiplexing is provided by detecting all reflection signals generated by a single input pulse of a given wavelength prior to the input coupling of the next input pulse. For example, the input pulse repetition period is illustratively $T \geq Nt_0$, N being the number of grating sensors and $t_0$ is their spacing or separation in optical propagation time.

According to a second feature of the invention, ambiguity in the direction of deviation of the sensed condition is eliminated, for symmetric Bragg grating sensors, for the same organization as described above, in that the laser wavelength and the center frequency of the reflectivity of the sensor are offset. The offset is about half of the grating reflection band full width at half-height bandwidth. Illustratively, while each sensor has its respective center frequency and interrogation wavelength, the sense of offset would be the same for all multiplexed sensors, to avoid a different ambiguity.

According to a third feature of the invention, a distributed optical fiber system with the above organization provides, in the plurality of laser pulse sources, two separated laser center frequencies for each one of the first plurality of sensors. Illustratively, this adaptation enables compensation for splice losses and losses at fixed bends. Even Rayleigh scattering losses can be prevented from affecting the calibration of the system.

Additional features and advantages of the invention will be set forth in the description which follows and in part will be apparent from the description, or may be learned by practicing the invention. The advantages of the invention will be realized and attained by the apparatus, systems and method particularly pointed out in the following written description, drawings, and claims.

The following detailed description is both exemplary and provides further explanation of the claimed invention. The accompanying drawings also provide a further understanding of the invention and illustrate several embodiments of the invention. Together with the description, the drawings also explain the principles of the invention.

DETAILED DESCRIPTION OF THE PREFERRED EMBODIMENTS

Overview

Reference will be made in detail to currently preferred embodiments of the invention, examples of which are illustrated in the accompanying drawings. Like reference numerals refer to like parts in the various figures of the drawings.

An optical fiber system includes a patterned array of weakly reflecting broadband gratings or other sensors serially disposed along a common fiber, the number of such sensors being limited only by the number of available laser sources having mutually resolvable center frequencies. The laser sources are multiplexed onto the fiber and are propagated through a directional coupler toward the sensors. The return signals are directed by the directional coupler to a demultiplexer that separates the signals by center frequencies and sends each to a respective detector. This arrangement should allow hundreds to potentially over 1000 sensing points to be addressed along a single fiber. The fiber could be many kilometers (km) long in this case, with the gratings either regularly spaced, or spaced in predetermined spatial patterns. The primary measurement of interest is of strain, although by use of a suitable transducer element, sensors for other parameters could be monitored, such as pressure and temperature. A pressure transducer is also enabled by the following description.

The weakly reflecting sensor elements are preferably linear edge fiber Bragg grating (LEFBG) elements, which are dispersed in either of two regular patterns along an optical fiber that is disposed to contact the areas where sensing is needed in a body under test. The needed variability in sensing points is feasible because the optical fiber is flexible and allows various limited, well-controlled bends in its placement. Other types of sensors that can be distributed along an optical fiber could be used in a similar way.

DESCRIPTION OF EMBODIMENTS

Several embodiments of the system are presented in FIG. 1–4.

Figure 1:
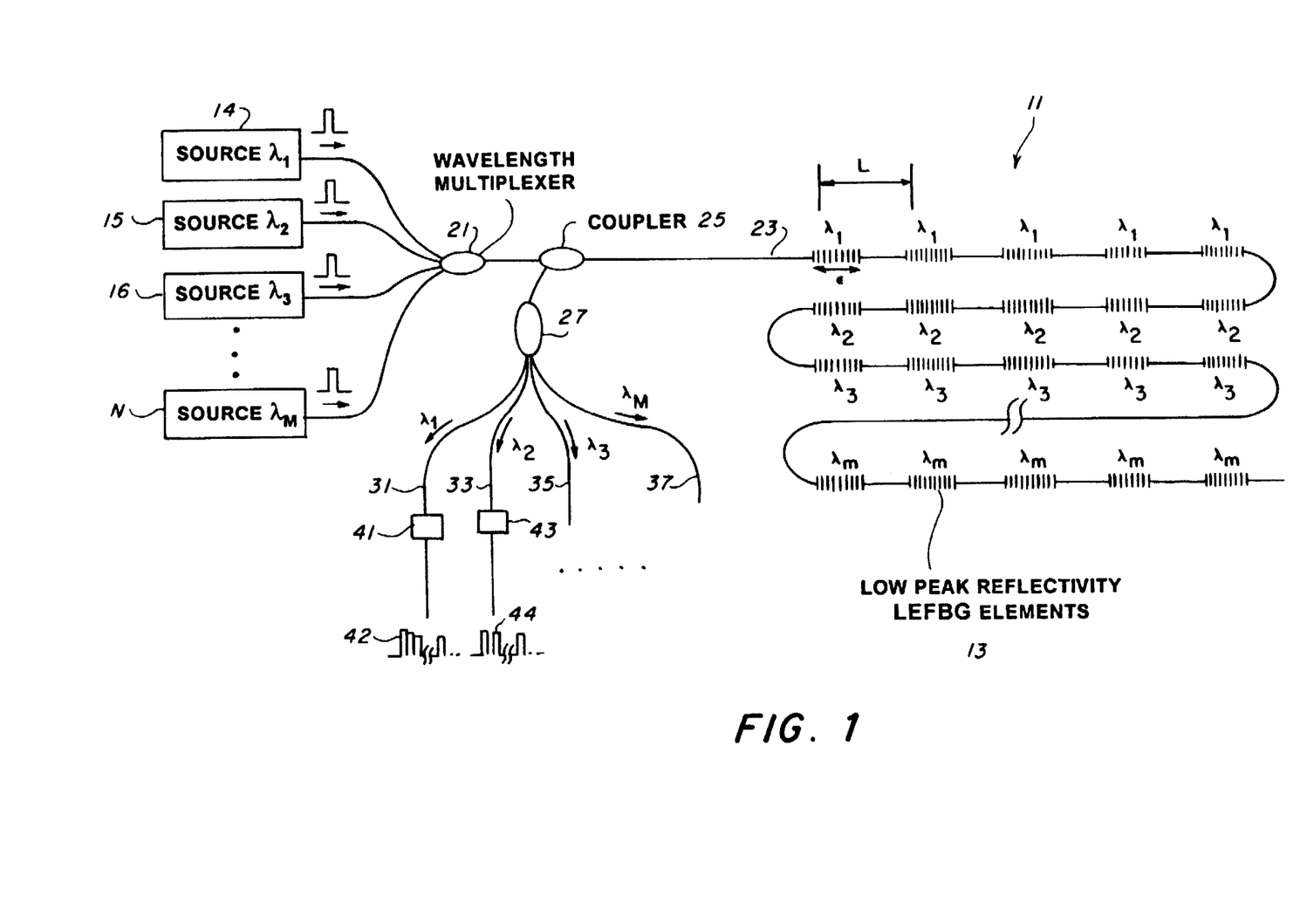
FIG. 1 is a diagram of a first embodiment of the invention.
Figure 2:
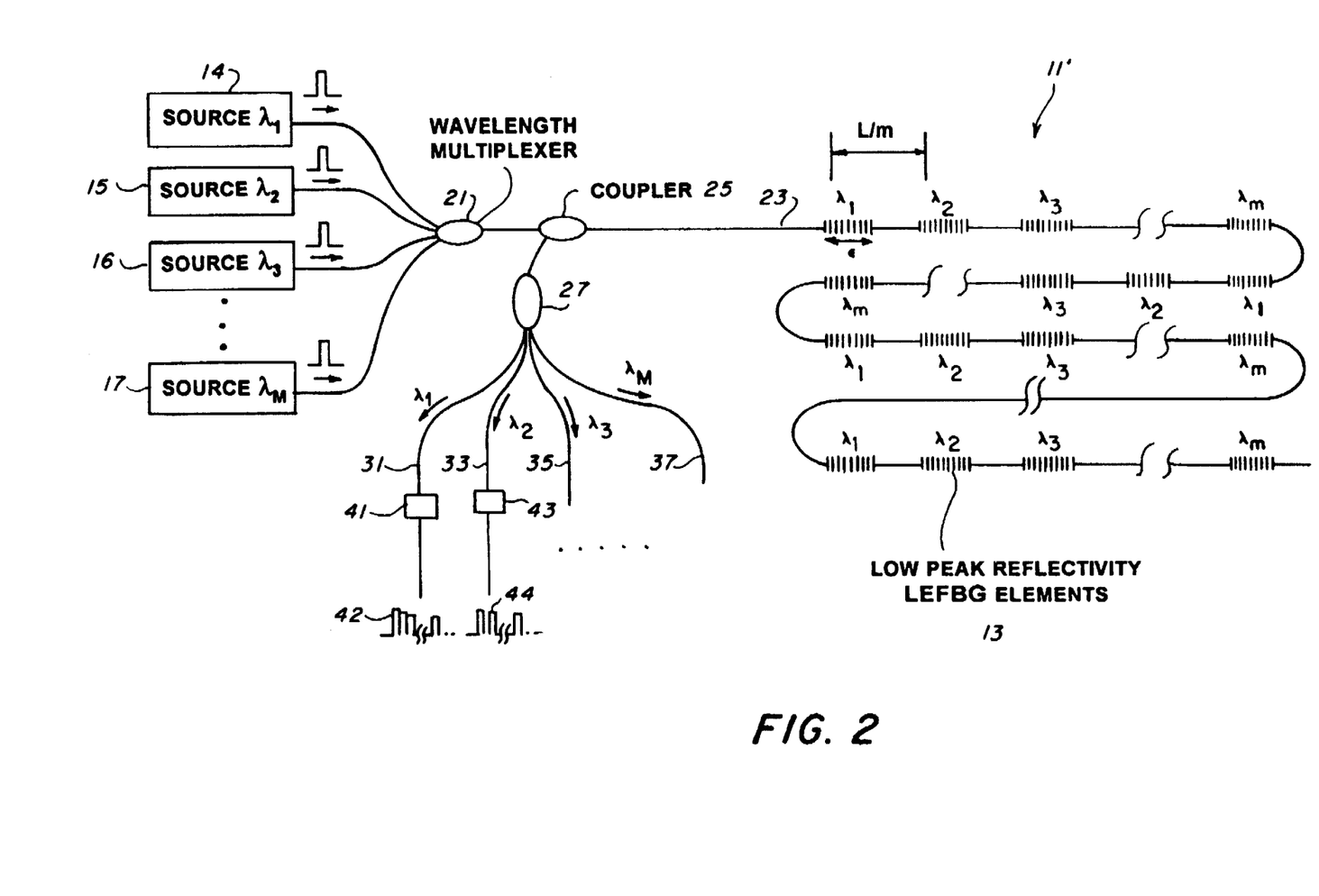
FIG. 2 is a diagram of a second embodiment of the invention.

FIG. 1 shows one embodiment of the system disclosed. The sensor array 11 comprises a series of weakly reflecting (<<1%) broadband grating elements 13 at a set of nominal wavelengths λ1 to λm. The grating elements 13 can be arranged either in serial groups at each wavelength as illustrated in FIG. 1, or as interleaved wavelength sets as shown in FIG. 2. The grating elements 13 are sensors. They are designed to reflect over a broadband of wavelengths either by utilizing short gratings (e.g., a 100 µm long un-chirped grating produces a grating with a bandwidth of ~10 nm at a nominal wavelength of ~1.3 µm), or by using symmetric or asymmetric, aperiodic (chirped)grating elements 13. Preferably, they are of the linear edge fiber Bragg grating type. Illustratively, they are sensing the strain in the body (not shown) on which they are mounted.

In the embodiment of FIG. 1, pulses of light from a series of lasers 14, 15, 16 ... N, each at the nominal wavelengths of the grating wavelengths λ1, λ2, λ3, to λn is injected through a wavelength combining device, a wavelength multiplexer 21, and the combined optical signal is coupled into the sensing fiber 23 through directional coupler 25. The light pulses are reflected off the series of broadband gratings 13 in the fiber 23 and produce a 'train' of reflected pulses. After reverse passage of the reflected pulses through the directional coupler 25, a second wavelength multiplexer 27 is connected to receive the reflected pulse train and to divide the wavelengths back out onto separate fiber 'channels', illustratively 31, 33, 35, and 37 for wavelengths λ1 to λ4, each of which is fed to an associated one of detectors 41, 43, and so forth. Each detector 'sees' a train of pulses reflected from the grating elements in the array 11, each grating element being written at the nominal wavelength corresponding to its channel.

In operation of the system of FIG. 1, for just one of its several wavelengths, the light pulses at λ1 launched into the fiber reflect off the gratings written in that 'channel' and having the λ1 center wavelength. The reflected light pulses produce returns $\lambda_1$ at the detector 41 and produce electrical pulses 42 at the output of the detector 41. The gratings at λ1 are spaced equally along the fiber length, and consequently produce a set of reflected pulses at regular intervals. If the distance between the gratings is d, the optical delay between pulses reflected from adjacent gratings is $t_o$=2 dn/c, where n is the index of refraction and c is the velocity of light. As an example of this delay, for a spacing d=5 m, the delay between reflected pulses corresponds to ~50 ns. If the input pulse from the laser has a width less than 50 ns, the output train of pulses will be distinct (separate resolved pulses). In order to resolve the pulses reflected by each grating element 13, the repetition rate of the input laser 14 is set to allow all the reflection components to be detected prior to the production of the next input pulse. Mathematically, this requirement translates into a relationship between the input pulse repetition period, T, and the number of gratings sensors, N, and grating spacing is $t_o$ of $T \geq Nt_o$.

Detection of the amplitude of the return signal from each grating element 13 will give a measure of the reflectivity of the grating. As the grating elements 13 are strained, the reflection profile moves off the nominal center wavelength, and the reflectivity falls. For a short unchirped grating element 13 with a Gaussian strength profile, the reflection profile will be Gaussian in shape (other profiles would also be suitable). As the grating moves off its nominal wavelength, the reflectivity at the laser wavelength 'traces-out' the profile of the grating element 13, producing a monotonic change in reflectivity with strain. If the laser wavelength and the nominal central Bragg wavelength of the unstrained grating element are equal, tensile and compressive strains of the grating element 13 produce a similar response (change in reflectivity with strain magnitude). However, if the laser wavelength and grating center wavelength, are initially offset by an amount corresponding to approximately 50% of the grating full width at half-height bandwidth, the reflectivity of the grating element 13 when unstrained will appear to be ~50% of the peak reflectivity. As the grating element 13 is now strained, the reflectivity will either increase or decrease with tensile or compressive strain, eliminating the ambiguity. As an example, if the unstrained grating center wavelength is slightly lower than the laser wavelength, the effective reflectivity will increase with tensile strain and decrease with compressive strain. The reverse would be true if the central wavelength of the unstrained grating was slightly higher than the laser wavelength. If the sensing grating element 13 is replaced with a tailored asymmetric linear-edge grating, a linear change in reflectivity with strain could be produced. The strain range of the system is dependent on the width (a dimension along the fiber 23) of the gratings used. For example, if the strain range of interest is ±0.5 %, the grating wavelength shift would be ~±5 nm at an operational wavelength of 1.3 µm, (or ~±6 nm at 1.5 µm). This would require a grating with a bandwidth of at least 10 nm (or 12 nm at 1.5 µm). Higher or lower strain ranges would require larger or smaller grating bandwidths, respectively.

The full system illustrated in FIG. 1 is a wavelength multiplexing of multiple independent time-division-multiplexed channels similar to the one channel just described, each operating at a different wavelength.

The two embodiments in FIGS. 1 and 2 allow for different degrees of spatial resolution. In FIG. 1, the grating elements 13 at each wavelength are grouped in separate sets. Here, the grating spacing L1 is determined by the input pulse width. For the case describe above, with a 50 ns pulse width, the grating spacing L1 is 5 m. However, in the embodiment in FIG. 2, the grating elements 13 are interleaved to provide improved spatial resolution. Here, for the same 50 ns input laser pulses, the gratings at a particular wavelength are each 5 m apart, but because of the spatial interleaving, the effective spacing between neighboring sensors is 5/M m, where M is the number of wavelengths. For a system with 5 wavelengths, the gratings can thus be spaced at 1 m intervals with 50 ns input pulses. Reducing the input pulse width to 10 ns would allow grating elements 13 to be spaced as close as 20 cm in a 5 wavelength system. Even closer spacing could be accommodated with faster pulses or by utilizing more wavelength channels. Thus, more complete sensing of strains in the body subject to test is enabled. The primary difference between FIG. 1 and 2 is the arrangement of array 11'.

One issue with this type of interrogation technique is the problem due to referencing (calibration) of the system output. The measurement of the reflectivity of the weakly reflecting grating elements 13 in the system could be corrupted by loss mechanisms in the fiber 23, such as bends which are necessary in a system of this type but, if too sharp, would attenuate the optical signals and give an apparent drop in reflectivity. Another loss mechanism is Rayleigh scattering. Such loss mechanisms could be addressed in two ways. Firstly, the weak reflected signals from the gratings could be compared to the Rayleigh backscatter from the fiber itself. The Rayleigh signal is very weak, but forms the basis of conventional Optical Time Domain Reflectometers (OTDR) used routinely to characterize fiber links for loss or breaks. Loss in the fiber due to bends or splices would be apparent from the Rayleigh OTDR measurement and thus could be used to compensate the grating reflectivity measurements.

As an alternative to this, if the grating elements used are symmetric in profile (e.g., short length uniform pitch gratings), a pair of wavelengths could be used for each wavelength channel in the system, and reflectivity measurements could be made on either side of the nominal center Bragg wavelength. For an unstrained grating, the reflectivities would be equal, whereas for a grating subjected to strain, the reflectivities measured would differ, indicating the shift in Bragg wavelength. This technique would be a general solution and could even overcome distortion due to Raleigh scattering itself. The paired wavelength technique could be implemented most readily by providing lasers 14, 15, 16 . . . M that are tunable in frequency (wavelength).

The systems of FIGS. 1 and 2 utilize directly pulsed lasers. This pulsing can cause chirping (frequency shifting) of the laser which might affect the performance of the system.

Figure 3:
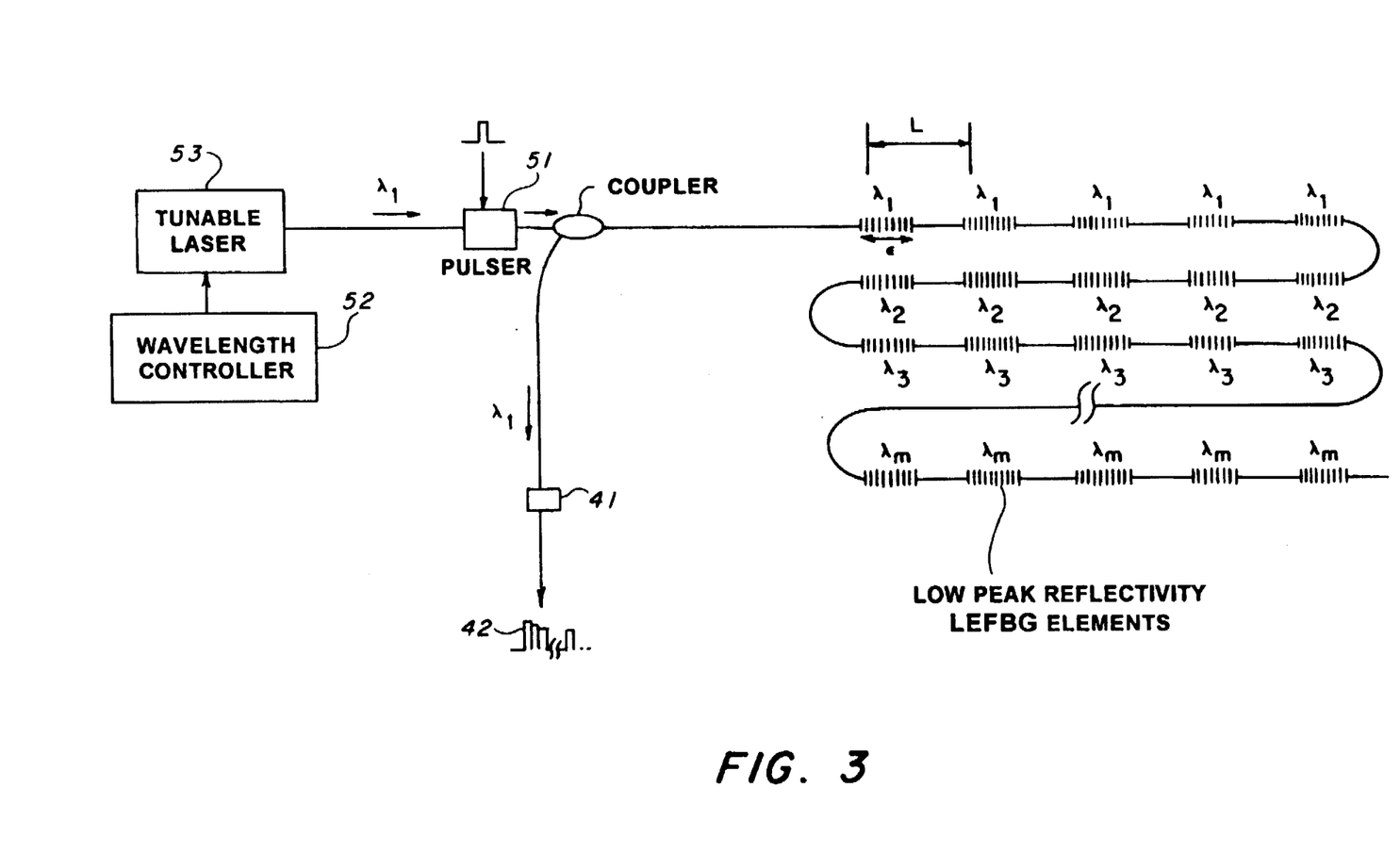
FIG. 3 is a diagram of a third embodiment of the invention.

Another alternative would be to utilize a single laser 53, as shown in FIG. 3. This laser 53 is tuned sequentially by wavelength controller 52 to each wavelength in the system and used to monitor the gratings at that wavelength using the time-domain addressing. This could be done quite rapidly, laser 53 being either a grating tuned laser or a tunable semiconductor laser of known type.

Figure 4:
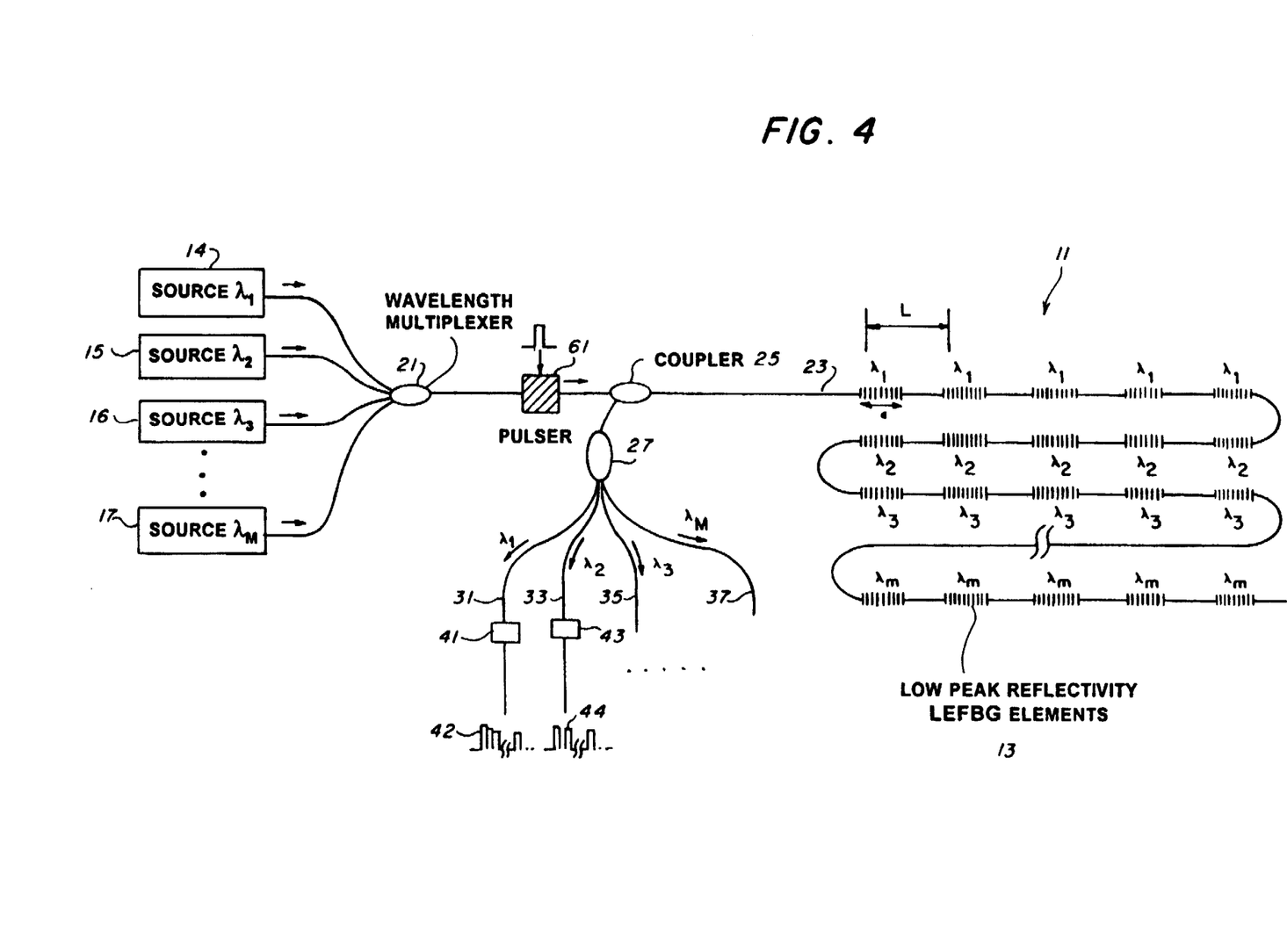
FIG. 4 is a diagram of a fourth embodiment of the invention.

FIG. 4 shows an alternative system in which an optical modulator or pulser 61 is used to pulse the input light. Here, a single modulator or pulser 61 pulses all the input wavelengths from sources 14, 15, 16 . . . M simultaneously and would tend to maintain separation between the different wavelength channels.

In the alternative implementation of FIG. 4, modulator 61 switches the light on and off according to a predetermined sequence (not shown) representing a noise-like code, or pseudo-random bit sequence (PRBS). Codes referred to as maximal or 'M-sequence' codes are an example of the type of code which can be used. The weakly reflecting elements Bragg gratings, reflect the code back with different delays. The electrical signals 42 and 44 derived from the photodetectors 41, 43 is passed to a correlator circuit (not shown) which mixes the signal with a time-delayed version of the PRBS (not shown) applied to the input modulator. This correlation step is standard in conventional spread-spectrum techniques used extensively in RF communications systems. Such systems could also take account of some variation in the spacing L.

Figure 5A:
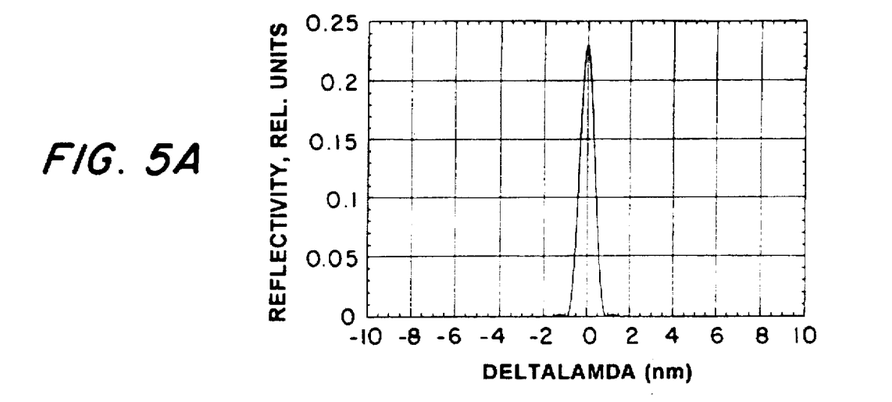
FIGS. 5A, 5B and 5C respectively show fiber Bragg grating reflection profiles for narrow-band, broadband and linear-edge gratings.
Figure 5B:
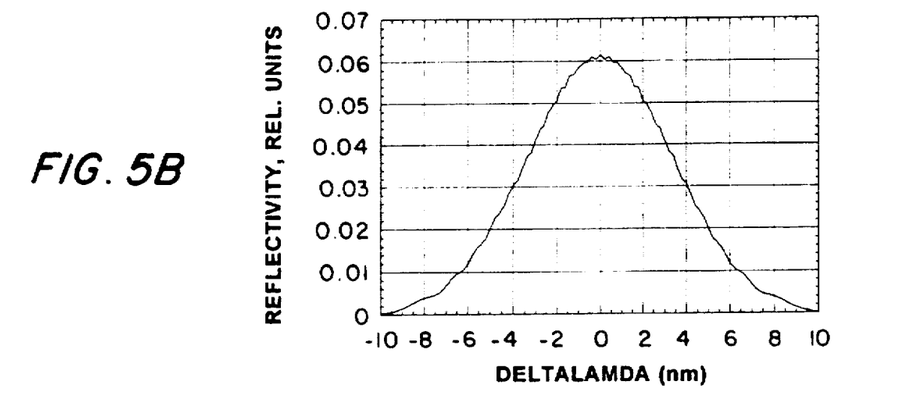
Figure 5C:
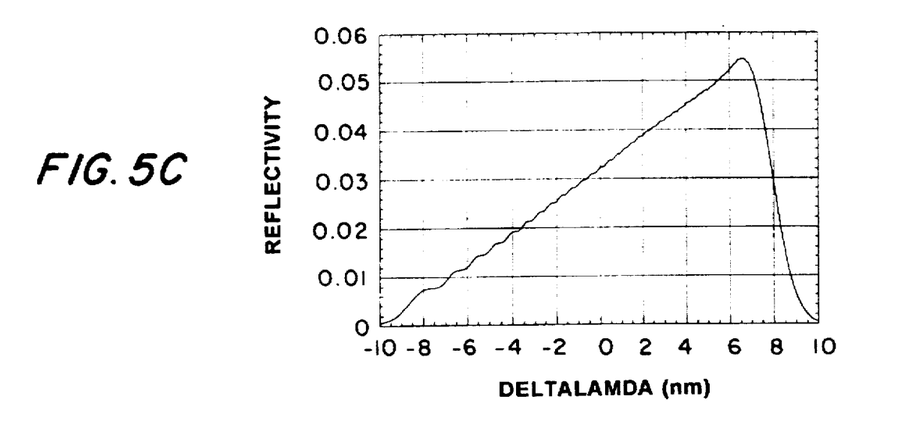

FIG. 5A shows the calculated spectral reflection profile (intensity) for a 5000 line grating element 13 with a Gaussian apodized index modulation and uniform grating pitch. The effect of changing the pitch in a linear fashion over the grating is to create an aperiodic grating, or chirped grating, while maintaining the same Gaussian apodization function, as shown in FIG. 5B. In this case, the grating pitch is varied by ±1% over the length of the device. FIG. 5C shows the reflectivity profile predicted for the same aperiodic pitch combined with an asymmetric index modulation profile. This reflection profile exhibits a substantially linear dependence of reflectivity on wavelength on one side of the profile. As the entire grating profile can be translated in wavelength by straining the fiber, this function thus clearly allows a strain-controlled reflectivity to be obtained for a given operational wavelength, and is suitable for use with distributed reflectometric sensing.

From a fabrication standpoint, this form of asymmetric index modulation can be accomplished by translating a shutter over the exposed region of the fiber, or by using a non-uniformly focused beam to provide different optical interference fringes in the writing UV beam at the two ends of the grating.

The above-described systems can accurately monitor the reflection coefficient of a series of gratings located at multiple points spatially separated by a length $\Delta L$ determined by the input optical pulse width.

For normal fiber Bragg grating, axial strain $\lambda_B$, given by $$\frac{1}{\lambda_B} \frac{\delta \lambda}{\delta \epsilon} B = \zeta \quad (1)$$

where $\zeta$ is a constant determined by the photoelastic properties of the fiber material ($\approx 0.78$ for silica). For an asymmetric chirped grating structure, each wavelength component within the grating profile shifts in accordance with eqn 1. For the linear region of the proposed function, which extends from a lower Bragg wavelength, $\lambda_{b1}$ to an upper value $\lambda_{b2}$ the reflectivity can be expressed as $$R(\lambda) = \left\{ \frac{\lambda - \lambda_{b1}}{\lambda_{b1} - \lambda_{b2}} \right\} R_p = \left\{ \frac{\lambda - \lambda_{b1}}{\Delta \lambda} \right\} R_p \quad (2)$$

where $R(\lambda_{b1})$ is the peak reflectivity, and $\Delta \lambda_b$ is the range of the linear function of the LEFBG. The reflectivity of the LEFBG is thus dependent on strain according to:

$$\delta R(\lambda, \epsilon) = \left\{ \frac{\lambda - \lambda_{b1}(1 + \zeta \epsilon)}{\Delta \lambda (1 + \zeta \epsilon)} \right\} R_p \quad (3)$$

For light at a 'biased' wavelength corresponding to the mid-point of the 'linear' region of the grating reflectivity function, i.e., $\lambda_0 = (\lambda_{b1} + \lambda_{b2})/2$, the variation of the reflectivity with strain can be approximately expressed as:

$$\delta R(\lambda \epsilon) = \left\{ \frac{1}{2} - \frac{\lambda_0}{\Delta \lambda} \zeta \epsilon \right\} R_p \quad (4)$$

which represents a linear variation in reflectivity with applied strain. This expression assumes that $\Delta \lambda / \lambda_0 \ll 1$, which holds for most practical normalized peak chirp deviations of ±1%.

Figure 6:
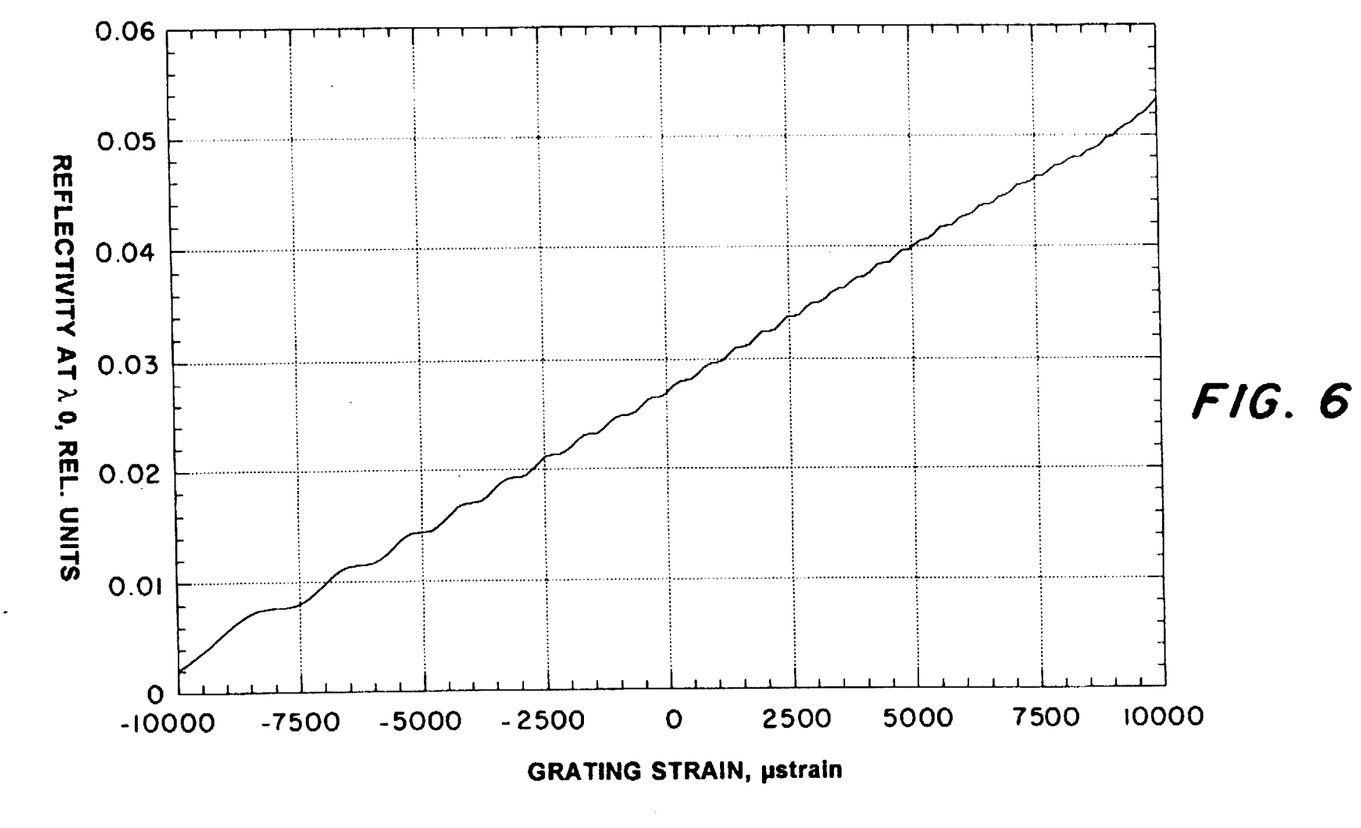
FIG. 6 illustrates the predicted form of dependence of reflectivity on fiber strain for a linear-edge fiber grating.

FIG. 6 shows the predicted variation in reflectivity vs. strain applied to the grating function of FIG. 5C. The strain range in this case is ±1 for a variation in reflectivity of 0 to the peak value of $R_p$. The peak value of reflectance could of course be altered by control of the grating exposure time or interference pattern of the writing beam.

It will be apparent to those skilled in the art that various modifications and variations can be made in the described combinations of the features of the present invention and in the implementation of each embodiment without departing from the spirit or scope of the invention. The present invention covers modifications and variations that come within the scope of the appended claims and their equivalents.

What is claimed is:

1. A distributed optical fiber sensor system, comprising:
   an optical fiber including a first plurality of sensors, said sensors being weakly reflective in a second plurality of distinct wavelength ranges;
   a third plurality of laser pulse sources each tuned to an intermediate point of one of said second plurality of distinct wavelength ranges;
   a multiplexer coupling output pulses of said laser pulse sources onto said optical fiber for propagation in a common direction toward said sensors;
   a directional coupler and a demultiplexer coupling reflected pulses from said sensors to a plurality of detectors, each of said detectors detecting a reflected one of said second plurality of distinct wavelength ranges, laser pulses from said laser pulse sources being timed to repeat after detection of said reflected pulses and to prevent earlier repetition.

2. A distributed optical fiber sensor system as claimed in claim 1, wherein said first plurality of sensors include multiple subpluralities of sensors, each of said subpluralities of sensors being weakly reflective in a respective one of said second plurality of wavelength ranges and providing reflected pulses that are time-division-multiplexed.

3. A distributed optical fiber sensor system as claimed in claim 2, wherein the sensors in each of said subpluralities of sensors are equally spaced along the fiber length to provide successive delays between reflected pulses greater than the pulse width of the laser pulse source providing the reflected pulses.

4. A distributed optical fiber sensor system as claimed in claim 1, wherein the first plurality of sensors are Bragg grating sensors.

5. A distributed optical fiber sensor system as claimed in claim 4, wherein said Bragg grating sensors are symmetric and periodic and have a nominal unstrained reflection band center wavelength offset from the laser center wavelength of the laser pulse source for which it is reflective by about half of the grating reflection band full width at half-height bandwidth.

6. A distributed optical fiber sensor system as claimed in claim 4, wherein said Bragg grating sensors are asymmetric and provide a linear change in reflectivity with strain and a bandwidth directly related to a range of strain to be sensed.

7. A distributed optical fiber sensor system as claimed in claim 2, wherein a first subplurality of said first plurality of sensors are interleaved with a second subplurality of said first plurality of sensors.

8. A distributed optical fiber sensor system, comprising:
an optical fiber including a first plurality of sensors, said sensors being weakly reflective in a second plurality of distinct wavelength ranges;
a third plurality of laser pulse sources each tuned to an intermediate point of one of said second plurality of distinct wavelength ranges;
a multiplexer coupling output pulses of said laser pulse sources onto said optical fiber for propagation in a common direction toward said sensors;
a directional coupler and a demultiplexer coupling reflected pulses from said sensors to a plurality of detectors, each of said detectors detecting a reflected one of said second plurality of distinct wavelength ranges, wherein said first plurality of sensors are Bragg grating sensors, said Bragg grating sensors being symmetric and periodic and having a nominal unstrained reflection band center wavelength offset from the laser center wavelength of the laser pulse source for which it is reflective by about half of the grating reflectivity full width at half-height bandwidth.

9. A distributed optical fiber sensor system as claimed in claim 8, wherein said first plurality of sensors include multiple subpluralities of sensors, each of said subpluralities of sensors being weakly reflective in a respective one of said second plurality of wavelength ranges and providing reflected pulses that are time-division-multiplexed.

10. A distributed optical fiber sensor system as claimed in claim 9, wherein the sensors in each of said subpluralities of sensors are equally spaced along the fiber length to provide successive delays between reflected pulses greater than the pulse width of the laser pulse source providing the reflected pulses.

11. A distributed optical fiber sensor system as claimed in claim 9, wherein laser pulses from said laser pulse sources are timed to repeat after detection of said reflected pulses and to prevent earlier repetition.

12. A distributed optical fiber sensor system as claimed in claim 11, wherein a first subplurality of said first plurality of sensors are interleaved with a second subplurality of said first plurality of sensors.

13. A distributed optical fiber sensor system, comprising:
an optical fiber including a first plurality of sensors, said sensors being weakly reflective in a second plurality of distinct wavelength ranges;
a third plurality of laser pulse sources each tuned to an intermediate point of one of said second plurality of distinct wavelength ranges;
a multiplexer coupling output pulses of said laser pulse sources onto said optical fiber for propagation in a common direction toward said sensors;
a directional coupler and a demultiplexer for coupling reflected pulses from said sensors to a plurality of detectors, each of said detectors detecting a reflected one of said second plurality of distinct wavelength ranges, wherein said first plurality of sensors are Bragg grating sensors, wherein said Bragg grating sensors are asymmetric and provide a linear change in reflectivity with strain and a bandwidth directly related to a range of strain to be sensed,
said first plurality of sensors including first and second subpluralities of asymmetric Bragg grating sensors weakly reflective in different ones of said second plurality of distinct wavelength ranges and being interleaved to provide successive sensors along said optical fiber of differing ones of said second plurality of distinct wavelength ranges.

14. A distributed optical fiber sensor system, comprising:
an optical fiber including a first plurality of sensors, said sensors being weakly reflective in a second plurality of distinct wavelength ranges;
a third plurality of laser pulse sources each tuned to an intermediate point of one of said second plurality of distinct wavelength ranges;
a multiplexer coupling output pulses of said laser pulse sources onto said optical fiber for propagation in a common direction toward said sensors;
a directional coupler and a demultiplexer coupling reflected pulses from said sensors to a plurality of detectors, each of said detectors detecting a reflected one of said second plurality of distinct wavelength ranges,
said third plurality of laser pulse sources providing two separated laser center frequencies for each one of said first plurality of sensors for weak reflection therefrom,
said each one of said plurality of sensors having a reflection band center frequency midway between the respective two separated laser center frequencies.

15. A distributed optical fiber sensor system as claimed in claim 14, wherein said first plurality of sensors include multiple subpluralities of sensors, each of said subpluralities of sensors being weakly reflective in a respective one of said second plurality of wavelength ranges and providing reflected pulses that are time-division-multiplexed.

16. A distributed optical fiber sensor system as claimed in claim 15, wherein the sensors in each of said subpluralities of sensors are equally spaced along the fiber length to provide successive delays between reflected pulses greater than the pulse width of the laser pulse source providing the reflected pulses.

17. A distributed optical fiber sensor system as claimed in claim 14, wherein the first plurality of sensors are Bragg grating sensors.

18. A distributed optical fiber sensor system as claimed in claim 17, wherein said Bragg grating sensors are symmetric and periodic and have a nominal unstrained reflection band center wavelength offset from the laser center wavelength of the laser pulse source for which it is reflective by about half of the grating reflectivity full width at half-height bandwidth.

19. A distributed optical fiber sensor system as claimed in claim 17, wherein said Bragg grating sensors are asymmetric and provide a linear change in reflectivity with strain and a bandwidth directly related to a range of strain to be sensed.

20. A distributed optical fiber sensor system as claimed in claim 15, wherein a first subplurality of said first plurality of sensors are interleaved with a second subplurality of said first plurality of sensors.

21. A distributed optical fiber sensor system as claimed in claim 15, including two separate laser pulse sources to provide said two separated laser center frequencies.

22. A distributed optical fiber sensor system as claimed in claim 15, wherein each of said third plurality of laser pulse sources is tunable to provide the two separated laser center frequencies.

* * * * *